(12) United States Patent
Liu et al.

(10) Patent No.: US 12,004,098 B2
(45) Date of Patent: Jun. 4, 2024

(54) CANDIDATE SYNCHRONIZATION SIGNAL BLOCK TRANSMISSION RESOURCES

(71) Applicant: LENOVO (BEIJING) LIMITED, Beijing (CN)

(72) Inventors: Hongmei Liu, Beijing (CN); Lianhai Wu, Beijing (CN); Haipeng Lei, Beijing (CN); Zhi Yan, Beijing (CN); Zhennian Sun, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 536 days.

(21) Appl. No.: 17/275,689

(22) PCT Filed: Sep. 29, 2018

(86) PCT No.: PCT/CN2018/108604
§ 371 (c)(1),
(2) Date: Mar. 12, 2021

(87) PCT Pub. No.: WO2020/062136
PCT Pub. Date: Apr. 2, 2020

(65) Prior Publication Data
US 2022/0104152 A1    Mar. 31, 2022

(51) Int. Cl.
*H04W 56/00* (2009.01)
*H04W 72/0446* (2023.01)
(Continued)

(52) U.S. Cl.
CPC ..... *H04W 56/001* (2013.01); *H04W 72/0446* (2013.01); *H04W 72/1273* (2013.01); *H04W 72/23* (2023.01)

(58) Field of Classification Search
CPC ........... H04W 56/001; H04W 72/0446; H04W 72/1273; H04W 72/23; H04L 5/0048; H04L 5/0094; H04L 5/0046
See application file for complete search history.

(56) References Cited

U.S. PATENT DOCUMENTS

2018/0199363 A1\* 7/2018 Lee ................ H04W 72/12
2019/0387485 A1\* 12/2019 Ko ................ H04W 72/04

FOREIGN PATENT DOCUMENTS

CN    108496321 A    9/2018
WO    2018106043 A1    6/2018
(Continued)

OTHER PUBLICATIONS

Nokia, Nokia Shanghai Bell, Remaining Details on Remaining Minimum System Information, 3GPP TSG-RAN WG1 NR AH#3, R1-1718613, Oct. 9-13, 2017, pp. 1-9, Prague, Czech Republic.
(Continued)

*Primary Examiner* — Jamal Javaid
(74) *Attorney, Agent, or Firm* — Kunzler Bean & Adamson

(57) ABSTRACT

Apparatuses, methods, and systems are disclosed for determining candidate synchronization signal block transmission resources. One method (800) includes receiving (802) first information indicating at least one candidate synchronization signal block transmission resource. The at least one candidate synchronization signal block transmission resource is useable for transmitting a synchronization signal block for inter-node discovery, measurement, or a combination thereof. The method (800) includes receiving (804) second information and downlink data corresponding to the second information. The method (800) includes decoding (806) the downlink data. Decoding the downlink data includes rate-matching around the at least one candidate synchronization signal block transmission resource.

23 Claims, 8 Drawing Sheets

(51) Int. Cl.
*H04W 72/1273* (2023.01)
*H04W 72/23* (2023.01)

(56) References Cited

FOREIGN PATENT DOCUMENTS

| WO | 2018171718 A1 | 9/2018 |
| WO | 2018174606 A1 | 9/2018 |

OTHER PUBLICATIONS

3GPP, 3rd Generation Partnership Project; Technical Specification Group Radio Access Network; Remaining issues of 6.1.4.3 Maintenance for MWUS, 3GPP R1-1809657, Aug. 2018, pp. 1-2.
International Searching Authority, "Notification of Transmittal of the International Search Report and the Written Opinion of the International Searching Authority, or the Declaration", PCT/CN2018/108604, dated Sep. 29, 2018, pp. 1-6.

\* cited by examiner

CANDIDATE SYNCHRONIZATION SIGNAL BLOCK TRANSMISSION RESOURCES

FIELD

The subject matter disclosed herein relates generally to wireless communications and more particularly relates to candidate synchronization signal block transmission resources.

BACKGROUND

The following abbreviations are herewith defined, at least some of which are referred to within the following description: Third Generation Partnership Project ("3GPP"), Acknowledge Mode ("AM"), Backhaul ("BH"), Broadcast Multicast ("BM"), Buffer Occupancy ("BO"), Base Station ("BS"), Bandwidth Part ("BWP"), Component Carrier ("CC"), Coordinated Multipoint ("CoMP"), Control Plane ("CP"), CSI-RS Resource Indicator ("CRI"), Channel State Information ("CSI"), Channel Quality Indicator ("CQI"), Central Unit ("CU"), Codeword ("CW"), Downlink ("DL"), Demodulation Reference Signal ("DMRS"), Data Radio Bearer ("DRB"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), Hybrid Automatic Repeat Request ("HARQ"), Integrated Access Backhaul ("IAB"), Identity or Identifier or Identification ("ID"), Interference Measurement ("IM"), International Mobile Subscriber Identity ("IMSI"), Internet-of-Things ("IoT"), Internet Protocol ("IP"), Joint Transmission ("JT"), Level 1 ("L1"), Logical Channel ("LCH"), Logical Channel Prioritization ("LCP"), Long Term Evolution ("LTE"), Multiple Input Multiple Output ("MIMO"), Mobile-Termination ("MT"), Machine Type Communication ("MTC"), Multi-User MIMO ("MU-MIMO"), Negative-Acknowledgment ("NACK") or ("NAK"), Next Generation ("NG"), Next Generation Node B ("gNB"), New Radio ("NR"), Non-Zero Power ("NZP"), Orthogonal Frequency Division Multiplexing ("OFDM"), Peak-to-Average Power Ratio ("PAPR"), Physical Broadcast Channel ("PBCH"), Physical Downlink Shared Channel ("PDSCH"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), Packet Switched ("PS"), Primary Synchronization Signal ("PSS"), Quasi Co-Located ("QCL"), Quality of Service ("QoS"), Radio Access Network ("RAN"), Radio Access Technology ("RAT"), Resource Element ("RE"), Rank Indicator ("RI"), Radio Link Failure ("RLF"), Radio Resource Control ("RRC"), Reference Signal ("RS"), Reference Signal Received Power ("RSRP"), Reference Signal Received Quality ("RSRQ"), Receive ("RX"), Secondary Cell ("SCell"), Service Data Unit ("SDU"), Subscriber Identity Module ("SIM"), Signal-to-Interference and Noise Ratio ("SINR"), Sequence Number ("SN"), Synchronization Signal ("SS"), SS/PBCH Block ("SSB"), Secondary Synchronization Signal ("SSS"), Time Division Multiplexing ("TDM"), Temporary Mobile Subscriber Identity ("TMSI"), Transmission Reception Point ("TRP"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), User Plane ("UP"), Universal Subscriber Identity Module ("USIM"), Universal Terrestrial Radio Access Network ("UTRAN"), Voice Over IP ("VoIP"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, SSBs may be used. In such networks, a device may not know what resources are used for the SSBs.

BRIEF SUMMARY

Methods for determining candidate synchronization signal block transmission resources are disclosed. Apparatuses and systems also perform the functions of the apparatus. In one embodiment, the method includes receiving first information indicating at least one candidate synchronization signal block transmission resource. In such an embodiment, the at least one candidate synchronization signal block transmission resource is useable for transmitting a synchronization signal block for inter-node discovery, measurement, or a combination thereof. In certain embodiments, the method includes receiving second information and downlink data corresponding to the second information. In various embodiments, the method includes decoding the downlink data. In such embodiments, decoding the downlink data includes rate-matching around the at least one candidate synchronization signal block transmission resource.

An apparatus for determining candidate synchronization signal block transmission resources, in one embodiment, includes a receiver that: receives first information indicating at least one candidate synchronization signal block transmission resource, wherein the at least one candidate synchronization signal block transmission resource is useable for transmitting a synchronization signal block for inter-node discovery, measurement, or a combination thereof; and receives second information and downlink data corresponding to the second information. In various embodiments, the apparatus includes a processor that decodes the downlink data. In such embodiments, decoding the downlink data comprises rate-matching around the at least one candidate synchronization signal block transmission resource.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
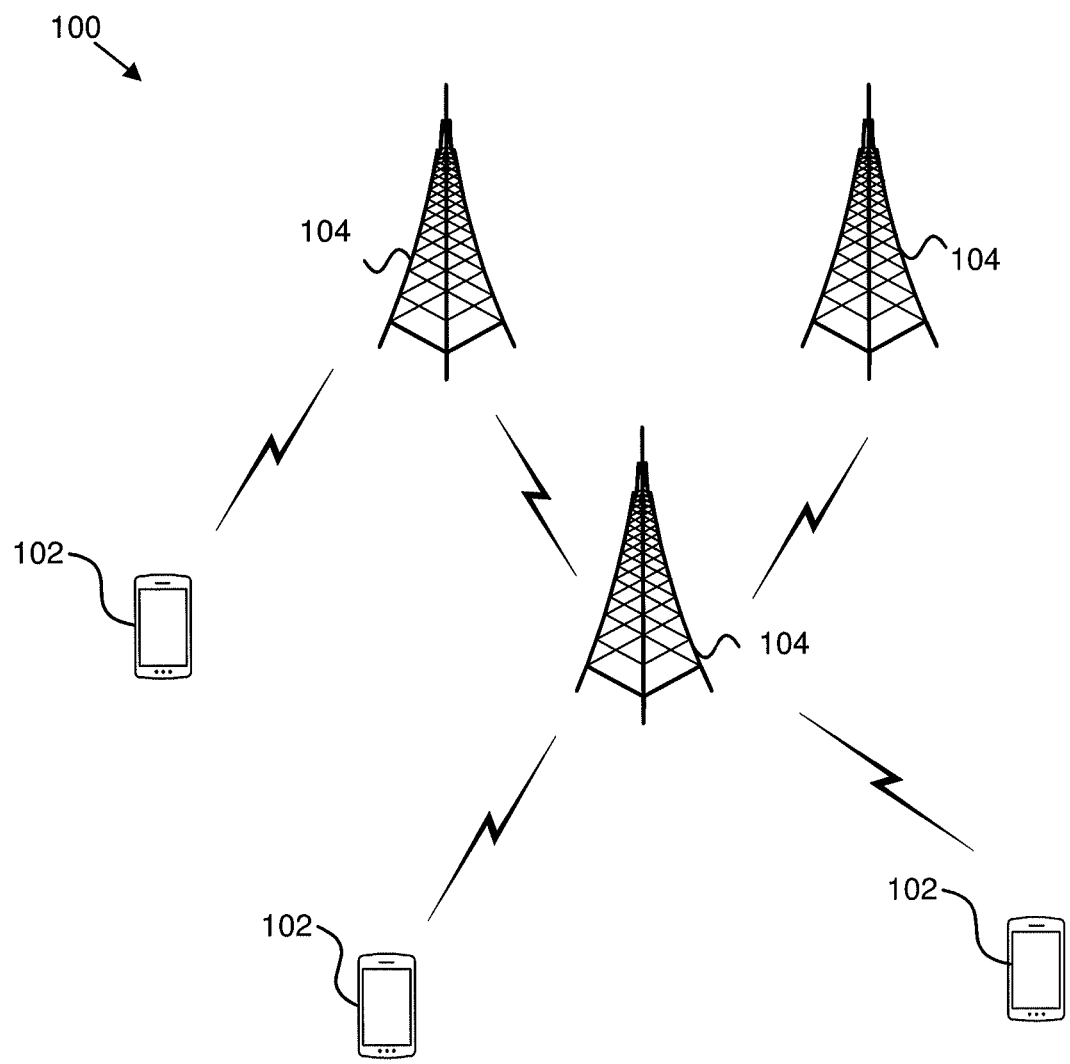
FIG. 1 is a schematic block diagram illustrating one embodiment of a wireless communication system for determining candidate synchronization signal block transmission resources.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining candidate synchronization signal block transmission resources. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may determine candidate synchronization signal block transmission resources. In various embodiments, the remote unit 102 may receive first information indicating at least one candidate synchronization signal block transmission resource. In such an embodiment, the at least one candidate synchronization signal block transmission resource is useable for transmitting a synchronization signal block for inter-node discovery, measurement, or a combination thereof. In certain embodiments, the remote unit 102 may receive second information and downlink data corresponding to the second information. In various embodiments, the remote unit 102 may decode the downlink data. In such embodiments, decoding the downlink data includes rate-matching around the at least one candidate synchronization signal block transmission resource. Accordingly, a remote unit 102 may be used for determining candidate synchronization signal block transmission resources.

In various embodiments, a child node may receive first information indicating at least one candidate synchronization signal block transmission resource from its parent node. In such embodiments, the at least one candidate synchronization signal block transmission resource is useable for transmitting a synchronization signal block for inter-node discovery, measurement, or a combination thereof. In certain embodiments, the child node may receive second information and downlink data corresponding to the second information. In various embodiments, the child node may decode the downlink data. In such embodiments, decoding the downlink data includes rate-matching around the at least one candidate synchronization signal block transmission resource.

In various embodiments, a first remote unit may receive first information indicating at least one candidate synchronization signal block transmission resource from a second remote unit. In such embodiments, the at least one candidate synchronization signal block transmission resource is useable for transmitting a synchronization signal block for inter-node discovery, measurement, or a combination thereof. In certain embodiments, the first remote unite may receive second information and downlink data corresponding to the second information. In various embodiments, the first remote unit may decode the downlink data. In such embodiments, decoding the downlink data includes rate-matching around the at least one candidate synchronization signal block transmission resource.

Figure 2:
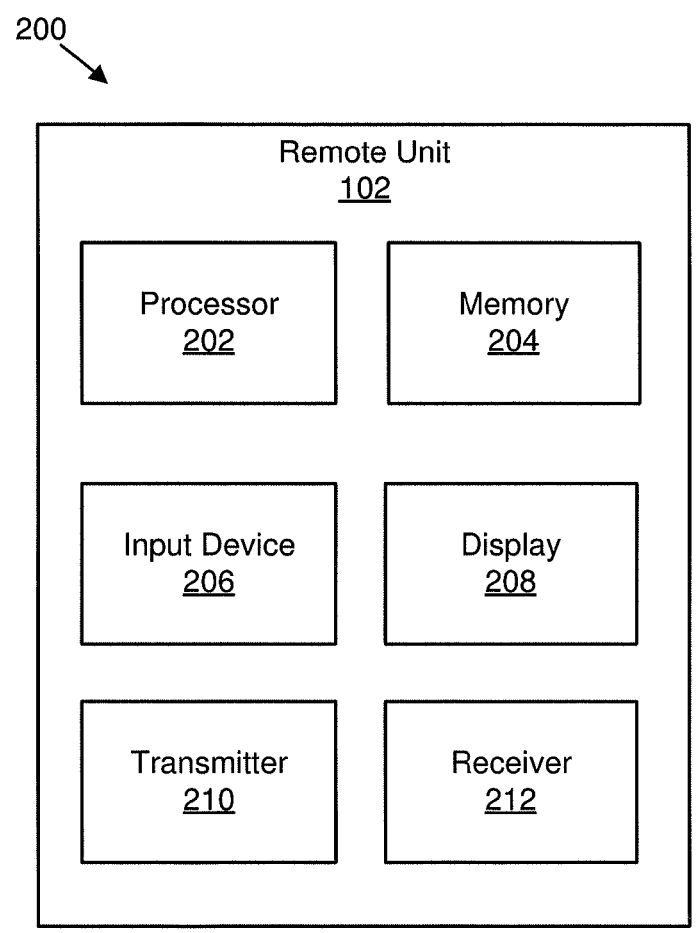
FIG. 2 is a schematic block diagram illustrating one embodiment of an apparatus that may be used for determining candidate synchronization signal block transmission resources.

FIG. 2 depicts one embodiment of an apparatus 200 that may be used for determining candidate synchronization signal block transmission resources. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 decodes the downlink data. In such embodiments, decoding the downlink data comprises rate-matching around at least one candidate synchronization signal block transmission resource. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In some embodiments, the receiver 212 may: receive first information indicating at least one candidate synchronization signal block transmission resource, wherein the at least one candidate synchronization signal block transmission resource is useable for transmitting a synchronization signal block for inter-node discovery, measurement, or a combination thereof; and receive second information and downlink data corresponding to the second information. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
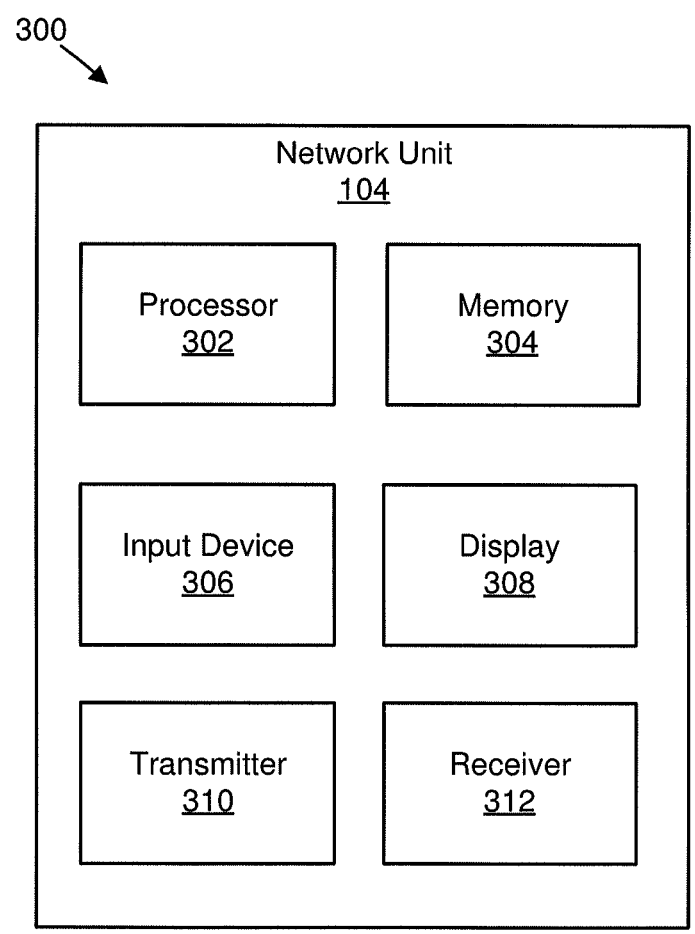
FIG. 3 is a schematic block diagram illustrating one embodiment of an apparatus that may be used for transmitting information indicating candidate synchronization signal block transmission resources and/or determining candidate synchronization signal block transmission resources.

FIG. 3 depicts one embodiment of an apparatus 300 that may be used for transmitting information indicating candidate synchronization signal block transmission resources and/or determining candidate synchronization signal block transmission resources. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the processor 302 determines candidate synchronization signal block transmission resources. In various embodiments, the transmitter 310 transmits synchronization signal blocks on the candidate synchronization signal block transmission resources.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
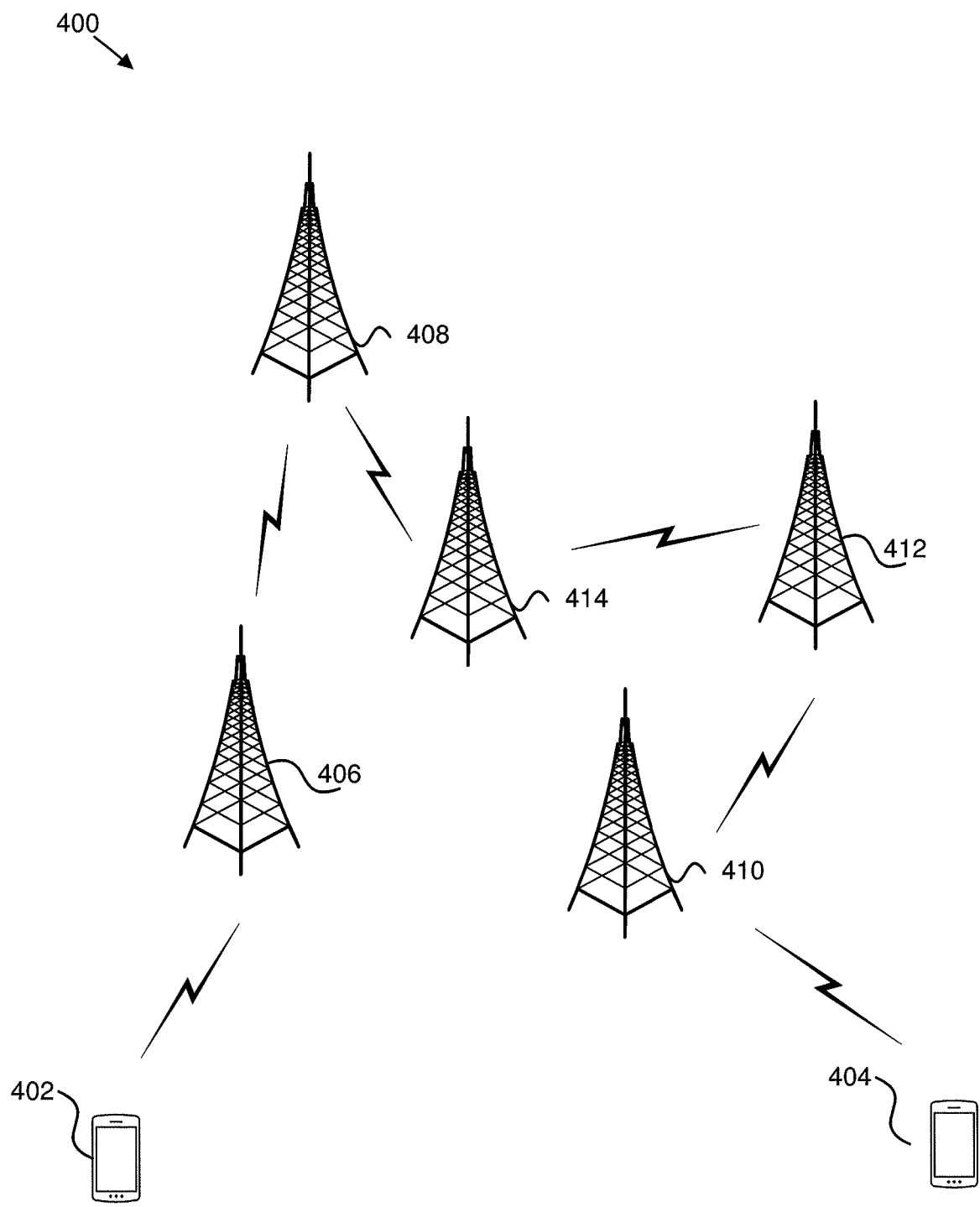
FIG. 4 is a schematic block diagram illustrating one embodiment of an integrated access backhaul system.

FIG. 4 is a schematic block diagram illustrating one embodiment of an integrated access backhaul ("IAB") system 400. The IAB system 400 includes a first UE 402, a second UE 404, a first IAB node 406, an IAB donor node 408, a second IAB node 410, a third IAB node 412, and a fourth IAB node 414. As illustrated, the first UE 402 is connected to the IAB donor node 408 via the first IAB node 406. Moreover, the second UE 404 is connected to the IAB donor node 408 via the second IAB node 410, the third IAB node 412, and the fourth IAB node 414. The IAB system 400, as illustrated, may be used for multi-hop backhauling via multiple IAB nodes.

As may be appreciated, multi-hop backhauling systems may provide a larger range extension than single hop systems. This may especially be beneficial for frequencies above 6 GHz due to a limited range of such frequencies. In some configurations, multi-hop backhauling enables backhauling around obstacles (e.g., buildings).

A maximum number of hops in a deployment may depend on many factors such as frequency, cell density, propagation environment, and traffic load. Thus, flexibility in hop count may be desirable. With an increased number of hops, scalability issues may arise, performance may be limited, and/or signaling load may increase signaling load to undesirable levels.

As may be appreciated, wireless backhaul links may be vulnerable to blockage (e.g., due to moving objects such as vehicles, due to seasonal changes (foliage), due to infrastructure changes (new buildings), and so forth). Such vulnerability may also apply to physically stationary IAB-nodes. In FIG. 4, the first UE 402 may switch from communicating via the first IAB node 406 to communicating with the second IAB node 410 if a backhaul link is blocked by objects (e.g., moving objects). Moreover, traffic variations may create uneven load distribution on wireless backhaul links leading to local link congestion and/or node congestion.

In some embodiments, an IAB node may include MT and DU. The MT function may be a component of a mobile equipment, or, as used herein, MT may be a function residing on an IAB node that terminates radio interface layers of a backhaul Uu interface toward the IAB-donor or other IAB nodes.

In various embodiments, a gNB may include a gNB-CU and one or more gNB-DUs. Moreover, a gNB-CU and a gNB-DU may be connected via an F1 interface. A gNB-CU may be a gNB central unit that is a logical node hosting RRC, SDAP, and PDCP protocols of the gNB. Furthermore, a gNB-DU may be a gNB distributed unit that is a logical node hosting RLC, MAC, and PHY layers of the gNB. In some embodiments, one cell is supported by only one gNB-DU.

In FIG. 4 the IAB nodes may be in a standalone mode which includes one IAB-donor and multiple IAB-nodes. The IAB-donor node 408 may be treated as a single logical node that includes a set of functions such as gNB-DU, gNB-CU-CP, gNB-CU-UP and potentially other functions. In certain embodiments, the IAB-donor node 408 may be split according to its functions which can all be either collocated or non-collocated as allowed by 3GPP NG-RAN architecture.

In various configurations, there may be collision issues regarding an SSB transmission and transmissions on other channels. The other channels may be PDSCH or other physical RS/channels. As used herein, collision may mean that the same time/frequency resource is used by SSB and other channels/RS. In such configurations, the SSB transmission may have a higher priority than the transmissions on the other channels. So the transmissions on the other channels may be dropped or may adopt rate matching to get around the SSB transmission.

In various embodiments, for both on-raster SSB and off-raster SSB for inter-IAB node measurement, there may be a TDM restriction for an IAB node. The TDM restriction may mean that an IAB node can't transmit and receive at the same time. To solve the half-duplex constraints, variable SSB transmission patterns may be used to make any pair of IAB nodes discovered by each other. With the variable SSB transmission patterns, different IAB nodes may transmit SSB at different time domain offsets. In some embodiments, the SSB transmission occasions within a periodicity may randomly change from periodicity to periodicity to avoid consistent SSB collision of two IAB nodes. In certain embodiments, multiple SSB transmission occasions may be used to provide more chances for inter-IAB node discovery and measurement. In addition, an SSB time domain pattern may be changed over time or between different IAB nodes. As used herein, an SSB can be a single SSB or a SSB set. A single SSB may occupy 4 symbols, and it may contain PSS, SSS, and/or PBCH. If the SSB is a single SSB, then the transmission occasion may be determined by a time domain starting position of PSS, SSS, and/or PBCH. In this embodiment, determination may mean that if there is an offset value for the SSB, then a smallest value of a starting position of PSS, SSS, and/or PBCH is set to the offset value. If the SSB is an SSB set, there may be multiple SSBs with different indices in a 5 ms time domain window. In this case, a transmission occasion may be determined by a time domain starting position of a first SSB in the SSB set. In this embodiment, the first SSB means an SSB with the smallest SSB index. In this embodiment, determination may mean that if there is an offset value to set the time domain position of the SSB set, then a smallest value of the starting position of PSS, SSS, and/or PBCH of the SSB with the smallest index is set to the offset value.

As may be appreciated, a mechanism may be used to inform a UE of the existence of an SSB for inter-IAB discovery and/or measurement if a gNB schedules PDSCH to the UE. With the knowledge of the existence of the inter-node discovery and/or measurement SSB, the UE may know the scheduled PDSCH is transmitted using rate matching around the SSB so that the UE can correctly decode the PDSCH.

For an IAB node, if an SSB transmitted by an IAB node for an access UE and an SSB for inter-IAB node discovery and/or measurement occupy different time domain resources, additional signaling can be used to indicate whether the SSB is for the access UE or the SSB is for inter-IAB node discovery and/or measurement. In some embodiments, the indication can be made in a MIB by using a reserved bit. In various embodiments, the indication can be made in SIB1 by using reserved bits. Regardless of whether the indication signaling is in MIB or in SIB1, 1 bit signaling can be used to differentiate two states: SSB for an access UE, or SSB for inter-node discovery and/or measurement. Although the described solutions and/or signaling is described in relation to an IAB network. The solution and/or signaling can also be used in a UE to UE network by replacing the IAB node with a UE.

Described herein are various alternatives for indicating to a UE the existence and/or positions of an SSB.

As may be appreciated, differing SSB transmissions may be used to make inter-IAB node discovery and/or measurement possible. In some embodiments, with TDM between backhaul link and access link, an IAB node can't transmit and receive information simultaneously. As a result, for any pair of IAB nodes, there may be two different SSB transmission occasions over a period of time. For example, a first IAB node may transmit at in first time window, and a second IAB node may transmit in a second time window, then the first IAB node can discover and/or measure the SSB of the second IAB node in the second time window, and the second IAB node can discover and/or measure the SSB of first IAB node in the first time window. In this way, the first IAB node and the second IAB node can be discovered and/or measured by each other.

A first option for SSB transmission may include all IAB nodes having different SSB transmission occasions. This option is not scalable if a number of IAB nodes passes a certain threshold because the number of SSB transmission occasions may be limited by an SSB transmission periodicity. For example, if the SSB transmission periodicity is 40 ms and each SSB occupies 5 ms, then there are only 8 different possible offsets for the 5 ms time window. In this example, the SSB transmission periodicity can support at most 8 IAB nodes with different time domain transmission occasions. If the IAB node number to be supported is larger than 8, then at least two IAB nodes need to share the same transmission time domain occasion. Both these two IAB nodes will transmit at the same time, and with TDM restriction, the two IAB nodes can't perform measurement at the same time that they are transmitting. Therefore, these two IAB nodes can't discover and/or measure each other.

Figure 5:
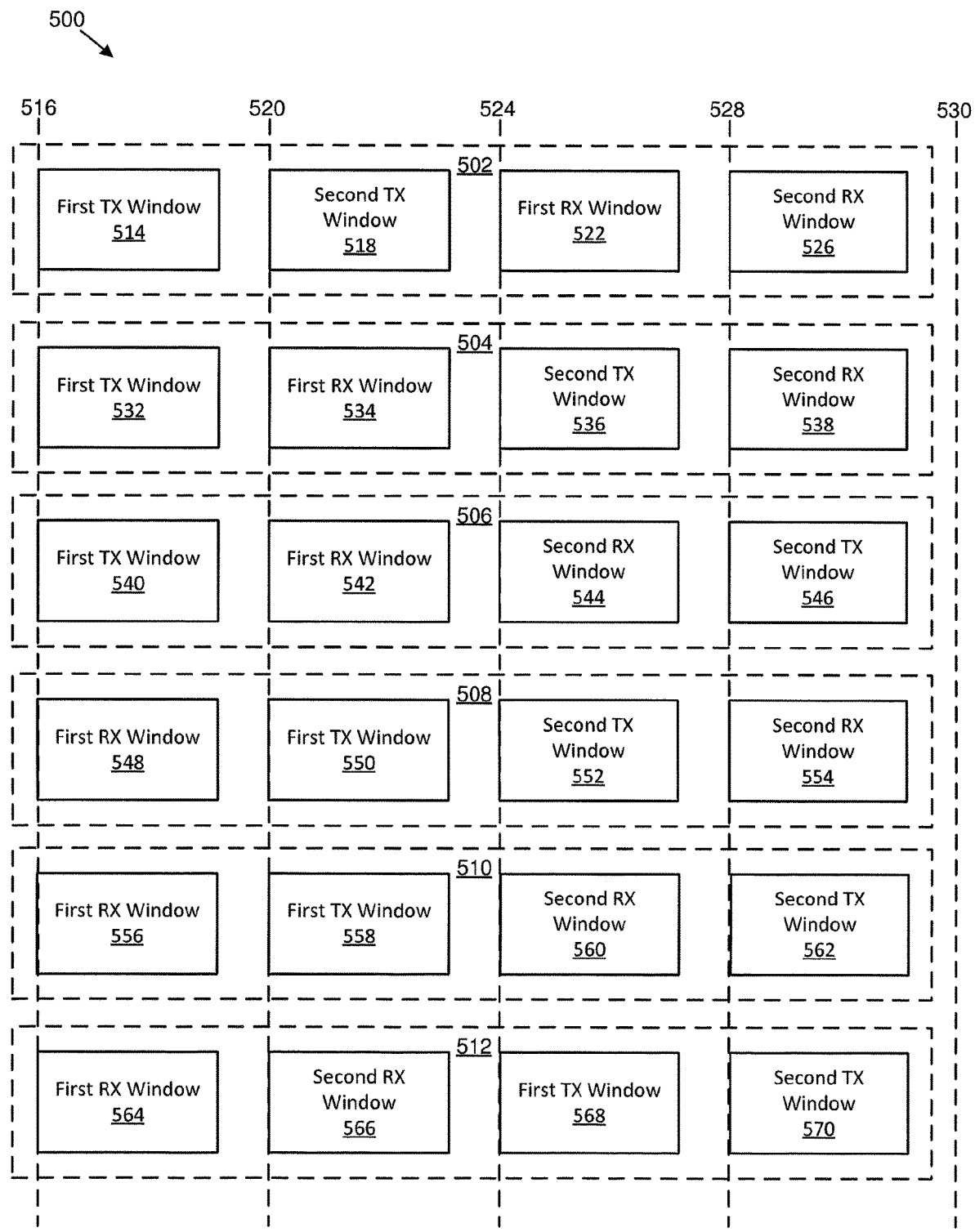
FIG. 5 is a schematic block diagram illustrating one embodiment of SSB transmission patterns.

A second option for SSB transmission may include each IAB node (or each group of IAB nodes) transmitting multiple times (e.g., twice) during a transmission periodicity. As may be appreciated, if there are N transmission occasions in the transmission periodicity and the number of transmission times for each IAB node or each IAB node group is two, a supportable distinct set number may be C(N,2). Moreover, a supportable IAB node or IAB node group number is also C(N,2). For the second option, different patterns can be used by each IAB node (or each group of IAB nodes). Because any two patterns have at least one non-overlapped time domain position, IAB nodes or IAB node groups using different patterns can discover and/or measure each other. One example is illustrated in FIG. 5. The pattern used may have an associated pattern index and each pattern can be used by an IAB node or an IAB node group. The IAB node or IAB node group can be identified by a set ID (or group ID). If the set ID is for a single IAB node, then the set with the set ID has only one IAB node in the set. If the set ID is for an IAB node group, then the set with the set ID has multiple IAB nodes in the set.

FIG. 5 is a schematic block diagram illustrating one embodiment of SSB transmission patterns 500. The transmission patterns 500 include a first pattern 502 that may have a pattern index of 1, a second pattern 504 that may have a pattern index of 2, a third pattern 506 that may have a pattern index of 3, a fourth pattern 508 that may have a pattern index of 4, a fifth pattern 510 that may have a pattern index of 5, and a sixth pattern 512 that may have a pattern index of 6. Moreover, the first pattern 502 includes a first TX window 514 that starts at a first time 516, a second TX window 518 that starts at a second time 520, a first RX window 522 that starts at a third time 524, and a second RX window 526 that starts at a fourth time 528. In such an embodiment, a transmission periodicity may start at the first time 516 and end at a fifth time 530. The transmission periodicity may be any suitable time period, such as 60 ms, 80 ms, 160 ms, and so forth. Accordingly, during the transmission periodicity, the first pattern 502 includes two TX windows and two RX windows. Furthermore, each of the patterns includes two TX windows and two RX windows. Moreover, as may be appreciated, each TX window and each RX window may span a predetermined period of time (e.g., 5 ms, 10 ms, 20 ms, and so forth). Furthermore, a time between the first time 516 and the second time 520 (e.g., 5 ms, 10 ms, etc.) may match the time between the second time 520 and the third time 524. In addition, the time between the second time 520 and the third time 524 may match the time between the third time 524 and the fourth time 528. Likewise, the time between the third time 524 and the fourth time 528 may match the time between the fourth time 528 and the fifth time 530.

The second pattern 504 includes a first TX window 532 that starts at the first time 516, a first RX window 534 that starts at the second time 520, a second TX window 536 that starts at the third time 524, and a second RX window 538 that starts at the fourth time 528. Moreover, the third pattern 506 includes a first TX window 540 that starts at the first time 516, a first RX window 542 that starts at the second time 520, a second RX window 544 that starts at the third time 524, and a second TX window 546 that starts at the fourth time 528. Furthermore, the fourth pattern 508 includes a first RX window 548 that starts at the first time 516, a first TX window 550 that starts at the second time 520, a second TX window 552 that starts at the third time 524, and a second RX window 554 that starts at the fourth time 528.

The fifth pattern 510 includes a first RX window 556 that starts at the first time 516, a first TX window 558 that starts at the second time 520, a second RX window 560 that starts at the third time 524, and a second TX window 562 that starts at the fourth time 528. Moreover, the sixth pattern 512 includes a first RX window 564 that starts at the first time 516, a second RX window 566 that starts at the second time 520, a first TX window 568 that starts at the third time 524, and a second TX window 570 that starts at the fourth time 528.

Figure 6:
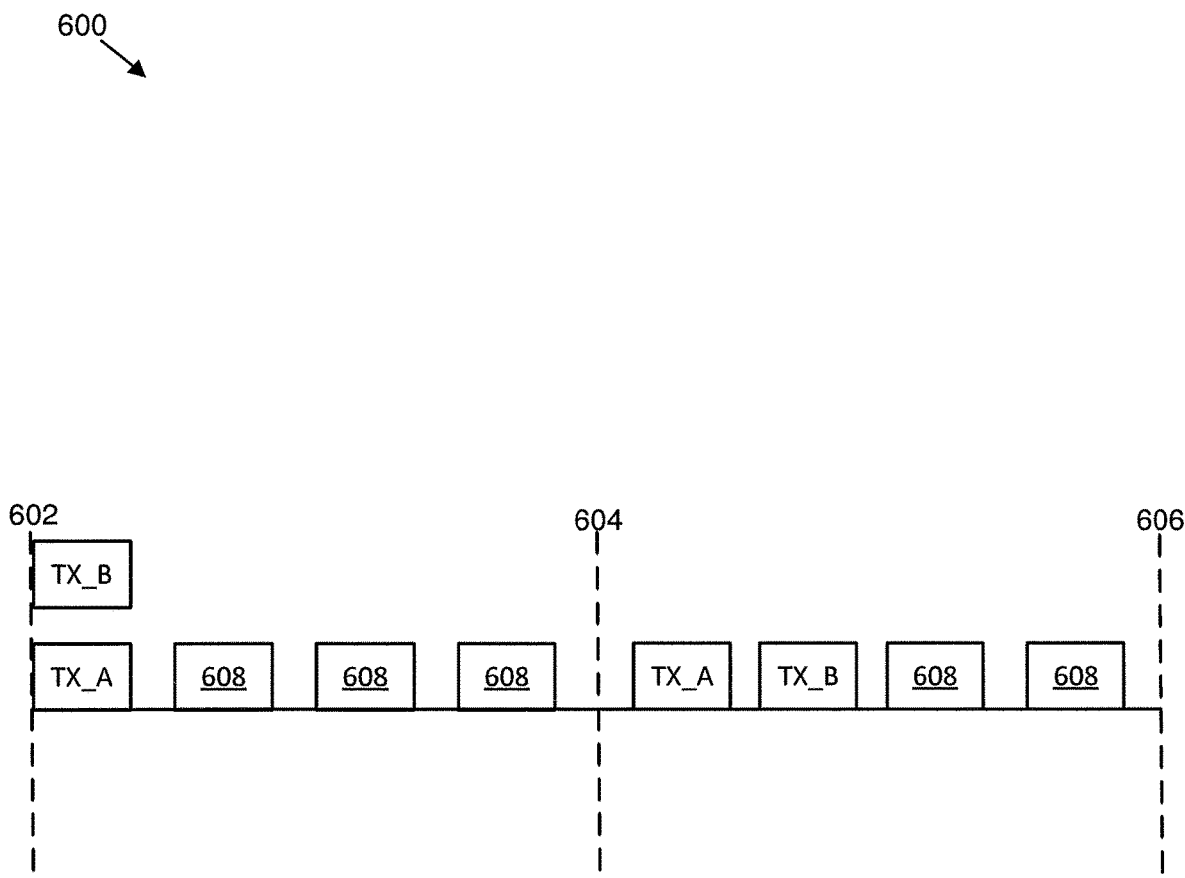
FIG. 6 is a schematic block diagram illustrating one embodiment of timing of SSB transmissions with a changing offset.

FIG. 6 is a schematic block diagram illustrating one embodiment of timing 600 of SSB transmissions with a changing offset. FIG. 6 is used to illustrate one example of a third option for SSB transmission. A first duration starts at a first time 602 and ends at a second time 604. In the above example, the first time 602 is 0 ms, and the second time 604 is 80 ms. In other embodiments, the first duration may be different from 80 ms. For example, the first duration may be 20 ms, 40 ms, 60 ms, 100 ms, 160 ms, and so forth. Moreover, a second duration starts at the second time 604 and ends at a third time 606. In the above example, the second time 604 is 80 ms, and the third time 606 is 160 ms. In other embodiments, the second duration may be different from 80 ms. For example, the second SSB duration may be 20 ms, 40 ms, 60 ms, 100 ms, 160 ms, and so forth. Various unused candidate SSB transmission resources 608 are illustrated.

The third option for SSB transmission may include randomly changing an SSB transmission occasion offset with respect to a starting position. In some embodiments, the SSB transmission occasion offset may be related to an IAB node ID and/or a time index. For example, if an SSB transmission periodicity is 80 ms, a first IAB node may transmit a first SSB (e.g., TX_A) in 0-4 ms and a second SSB (e.g., TX_A) in 85-89 ms in two adjacent SSB transmission periodicities (e.g., the first SSB transmission periodicity starts at 0 ms, and the second SSB transmission periodicity starts at 80 ms, and the offset for the SSB in time window 0-79 ms is 0 and the offset for the SSB in time window 80-159 ms is 5 ms). Moreover, a second IAB node may transmit a first SSB (e.g., TX_B) in 0-4 ms and a second SSB (e.g., TX_B) in 90-94 ms in two adjacent SSB transmission periodicities (the SSB offset in time window 0-79 ms is 0 ms and the SSB offset in time window 80-159 ms is 10 ms). In this example, the first SSB transmission for the first IAB node has an offset of 0 ms with respect to the starting position of the corresponding SSB transmission periodicity, while the second SSB transmission for the first IAB node has an offset of 5 ms with respect to the starting position of the corresponding SSB transmission periodicity. Moreover, the first SSB transmission for the second IAB node has an offset of 0 ms with respect to the starting position of the corresponding SSB transmission periodicity, while the second SSB transmission for the second IAB node has an offset of 10 ms with respect to the starting position of the corresponding SSB transmission periodicity. As may be appreciated, the SSB transmission occasion offset may be changed per SSB transmission periodicity. This example is illustrated in FIG. 6. With timely changing the SSB offset, even if two IAB nodes can't discover and/or measure each other in the first SSB transmission duration, the two IAB nodes may have an opportunity for discovery and/or measurement in the second SSB transmission duration.

A fourth option may be a combination of the second option and the third option. In certain embodiments, the second option may be applicable to each IAB node group, and the third option may be applied to each IAB node group. In some embodiments, an IAB node ID and/or time domain index may be used to calculate a group ID (e.g., set ID) for each periodicity (e.g., SSB transmission periodicity). Once the set ID is determined for each periodicity, the SSB time domain transmission offsets can be determined based on the relationship between the set ID and the offsets.

Figure 7:
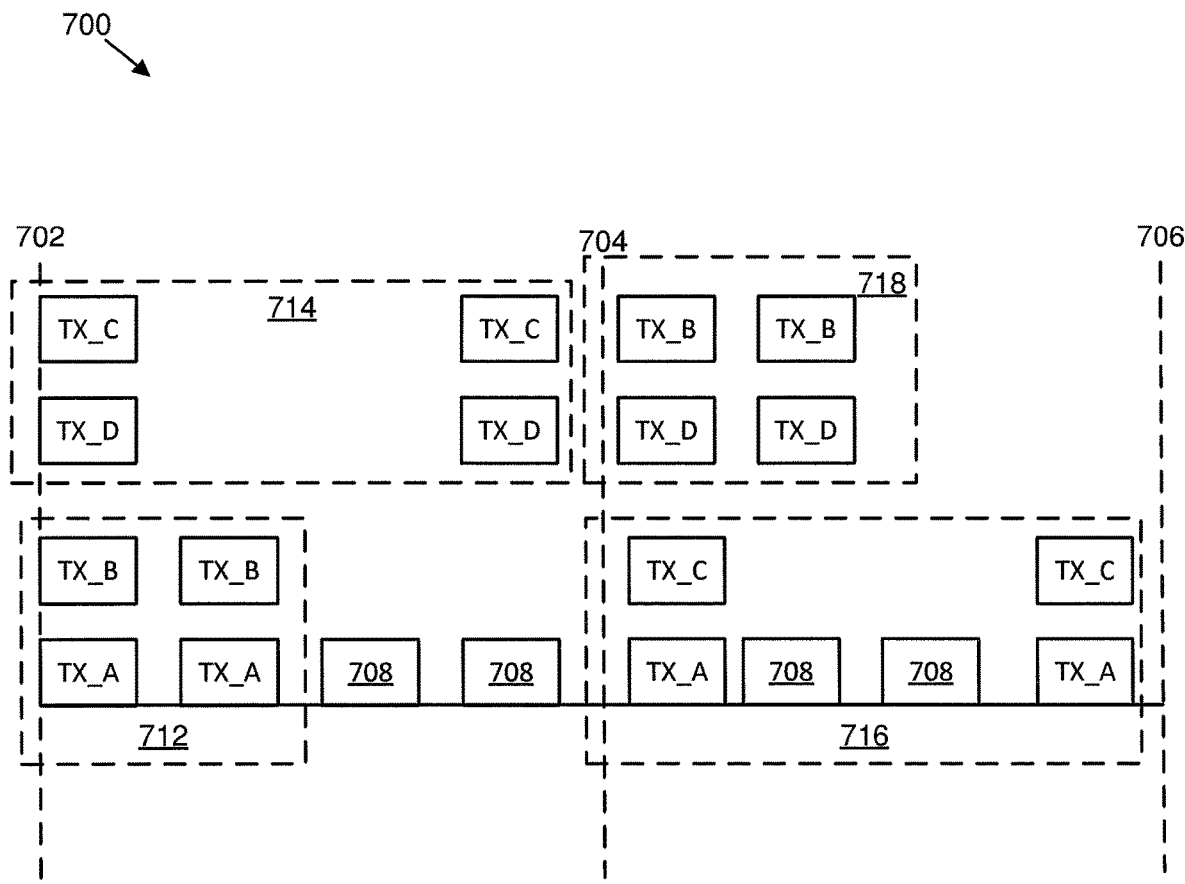
FIG. 7 is a schematic block diagram illustrating one embodiment of timing of SSB transmissions in SSB transmission sets.

FIG. 7 is a schematic block diagram illustrating one embodiment of timing 700 of SSB transmissions in SSB transmission sets. A first duration starts at a first time 702 and ends at a second time 704. In this embodiment, the first time 702 is 0 ms, and the second time 704 is 80 ms. In other embodiments, the first duration may be different from 80 ms. For example, the first duration may be 20 ms, 40 ms, 60 ms, 100 ms, 160 ms, and so forth. Moreover, a second duration starts at the second time 704 and ends at a third time 706. In this embodiment, the second time 704 is 80 ms, and the third time 706 is 160 ms. In other embodiments, the second duration may be different from 80 ms. For example, the second duration may be 20 ms, 40 ms, 60 ms, 100 ms, 160 ms, and so forth. Various unused candidate SSB transmission resources 708 are illustrated. As illustrated within the first SSB transmission periodicity, a first IAB node may make first and second transmissions ("TX_A"), a second IAB node may make first and second transmissions ("TX_B"), a third IAB may make first and second transmissions ("TX_C"), and a fourth IAB may make first and second transmissions ("TX_D"). The first and the second IAB nodes share the same time domain pattern, and they can be considered in the same set (e.g., set 1) in the first transmission duration (e.g., time window). The third and the fourth IAB nodes also share the same time domain pattern (e.g., same transmission offsets), and they can also be considered in the same set (e.g. set 2) in the first transmission duration (e.g., time window from 0 to 79 ms).

Furthermore, as illustrated within the second duration (e.g., time window 80-159 ms), the first IAB node may make third and fourth transmissions ("TX_A"), the second IAB node may make third and fourth transmissions ("TX_B"), the third IAB may make first and second transmissions ("TX_C"), and the fourth IAB may make first and second transmissions ("TX_D"). The first and the third IAB nodes share the same time domain offsets, and they can be considered in the same set (e.g., set 1). The second and the fourth IAB nodes share the same time domain offsets, and they can be considered in the same set (e.g., set 2). Therefore, the associated set for the second IAB node is changed from set 1 to set 2, and the time domain offsets of the second IAB node also changed accordingly. For the two IAB nodes, the first IAB node and the second IAB node, although they can't discover and/or measure each other in the first duration, they can discover and/or measure each other in the second duration.

In the illustrated embodiment, similar to the description corresponding to FIG. 6, different transmissions from the same IAB may have an offset that changes from one duration to another. For example, the first TX_A has an offset of 0 relative to the first time 702, while the third TX_A has an offset different from 0 relative to the second time 704 (e.g., 10 ms). As another example, the first TX_D has an offset of 0 relative to the first time 702, while the third TX_D has an offset different from 0 relative to the second time 704 (e.g., 5 ms). Furthermore, as illustrated, transmissions from the IABs are grouped together into groups (or sets). For example, a first group 712 in the first SSB transmission periodicity includes the first and second transmissions TX_A and the first and second transmissions TX_B. As another example, a second group 714 in the first SSB transmission periodicity includes the first and second transmissions TX_C and the first and second transmissions TX_D. As illustrated, the transmissions within a group follow the same pattern and have the same offset. Moreover, a first group 716 in the second SSB transmission periodicity includes the first and second transmissions TX_A and the first and second transmissions TX_C. Furthermore, a second group 718 in the second SSB transmission periodicity includes the first and second transmissions TX_B and the first and second transmissions TX_D. Thus, as illustrated groupings between different SSB transmission periodicities may change.

As may be appreciated, there may be a variety of methods used to indicate a time domain position of a candidate (e.g., possible) SSB transmission to enable a UE to use the position information for rate matching.

In one embodiment, a time domain position of a candidate SSB transmission for inter-IAB discovery and/or measurement may be dynamically indicated by a gNB. In certain embodiment, a set of candidate time domain positions of the SSB transmission for inter-IAB discovery and/or measurement may be configured by RRC signaling transmitted to a UE. In some embodiments, such as those based on the third option described herein, candidate SSB transmission occasions may include all possible SSB offsets if the offset is changed periodically. In certain embodiments, such as those based on the second option and/or the fourth option, candidate SSB transmission occasions may include all possible SSB offsets for all group/set indexes.

In various embodiments, if a UE has a scheduled PDSCH, the UE may detect the existence of one or multiple SSB transmission occasions by a variety of methods. In a first method, the UE may detect the existence of one or multiple SSB transmission occasions using blind decoding. The blind decoding may be based on a PSS, a SSS, a PBCH, and/or a DMRS. In a second method, the UE may detect the existence of one or multiple SSB transmission occasions using additional bits in scheduling DCI that are used to indicate the existence of one or multiple SSB transmission occasions. In such embodiments, the relationship between DCI bits to SSB transmission occasion sets may be configured by RRC signaling. In a third method, the UE may detect the existence of one or multiple SSB transmission occasions using information (e.g., 1 or more bits) in DCI to indicate whether or not there is an SSB transmission occasion for inter-IAB node measurement in the time/frequency resource of the scheduled PDSCH.

In another embodiment, a time domain position of a candidate SSB transmission for inter-IAB discovery and/or measurement may be semi-statically configured by RRC signaling. In some embodiments, such as those based on the second option described herein, for an IAB node set, multiple SSBs may be transmitted in one period and the same SSB transmission patterns may be transmitted in adjacent periods. In such embodiments, an SSB transmission periodicity may be indicated to the UE. As may be appreciated, within a single SSB transmission periodicity, there may be multiple SSB transmission occasions. Furthermore, in such embodiments, a group ID (e.g., set ID) may be indicated to the UE. In some embodiments, an IAB node ID may not be used to generate a group ID because the IAB node ID has other purposes for interference randomization, while the group ID may be used to select several IAB nodes to share the same SSB transmission pattern. Therefore, there may be some coordination based on a network structure, so that the network may determine the group ID for each IAB node. Moreover, a mapping relationship between a group ID and SSB transmission occasions may be predefined in a specification or configured by RRC signaling. As may be appreciated, RRC configuration may be used to adjust a network structure efficiently.

In certain embodiments, such as those based on the third option described herein, one or multiple SSBs may be transmitted in an SSB transmission periodicity. Moreover, a transmission occasion of each SSB may be randomly changed in adjacent SSB transmission periodicities. In such embodiments, a duration may be indicated to a UE. In each duration, there may be one or more SSBs within it, the duration may occur periodically, and adjacent durations may be continuous in the time domain. A timely change of an SSB transmission occasion may mean that the offset of the SSB with respect to the start of each respective duration is changed randomly. In each adjacent duration, the transmission occasion of each SSB may be updated. The duration may be 40 ms, 80 ms, 160 ms, and so forth. In such embodiments, the number of SSB transmission occasions within a duration may be indicted to a UE by RRC signaling. In certain embodiments, an SSB transmission occasion for each SSB within a duration may be decided by parameters such as: an IAB node ID, a time domain index, and/or an SSB transmission occasion index within a duration. In such embodiments, because an IAB node ID and a time domain index may be detected by a UE from system information, there may be no signaling used to indicate these two parameters. In certain embodiments, if different IAB nodes share a same cell ID, another sub-ID to differentiate different IAB nodes may be indicated to UE.

In various embodiments, such as those based on the fourth option described herein, changing a group ID for an IAB node may result in a change to candidate SSB transmission occasions in time domain. In such embodiments, a duration may be indicated to a UE, the duration may be a time domain window, the duration may appear periodically, and adjacent durations may be continuous in the time domain. Being continuous in the time domain may mean that an ending of a duration is also a starting of the next duration. Within each duration, for an IAB node, there are one or multiple SSB transmission occasions corresponding to a set ID. The transmission occasion is determined based on the offset respect to the starting of the corresponding duration. Here corresponding may mean that the SSB is located within the duration. In each adjacent duration, the transmission occasion of each SSB set ID may be updated. As a set ID is associated with one or more SSB transmission occasions, once the set ID is changed, the one or more SSB transmission occasions are changed. Moreover, in such embodiments, a maximum number of group IDs may be indicated to the UE. The maximum number of group IDs may be predefined in a specification or configured by RRC signaling. Furthermore, in such embodiments, a mapping relationship between a group ID and SSB transmission occasions may be predefined in a specification or configured by RRC signaling. In some embodiments, an initial value of a group ID may be indicated to the UE by RRC signaling. In certain embodiments, an IAB node ID and/or a time domain index may be used to determine a group ID per an SSB transmission periodicity.

Figure 8:
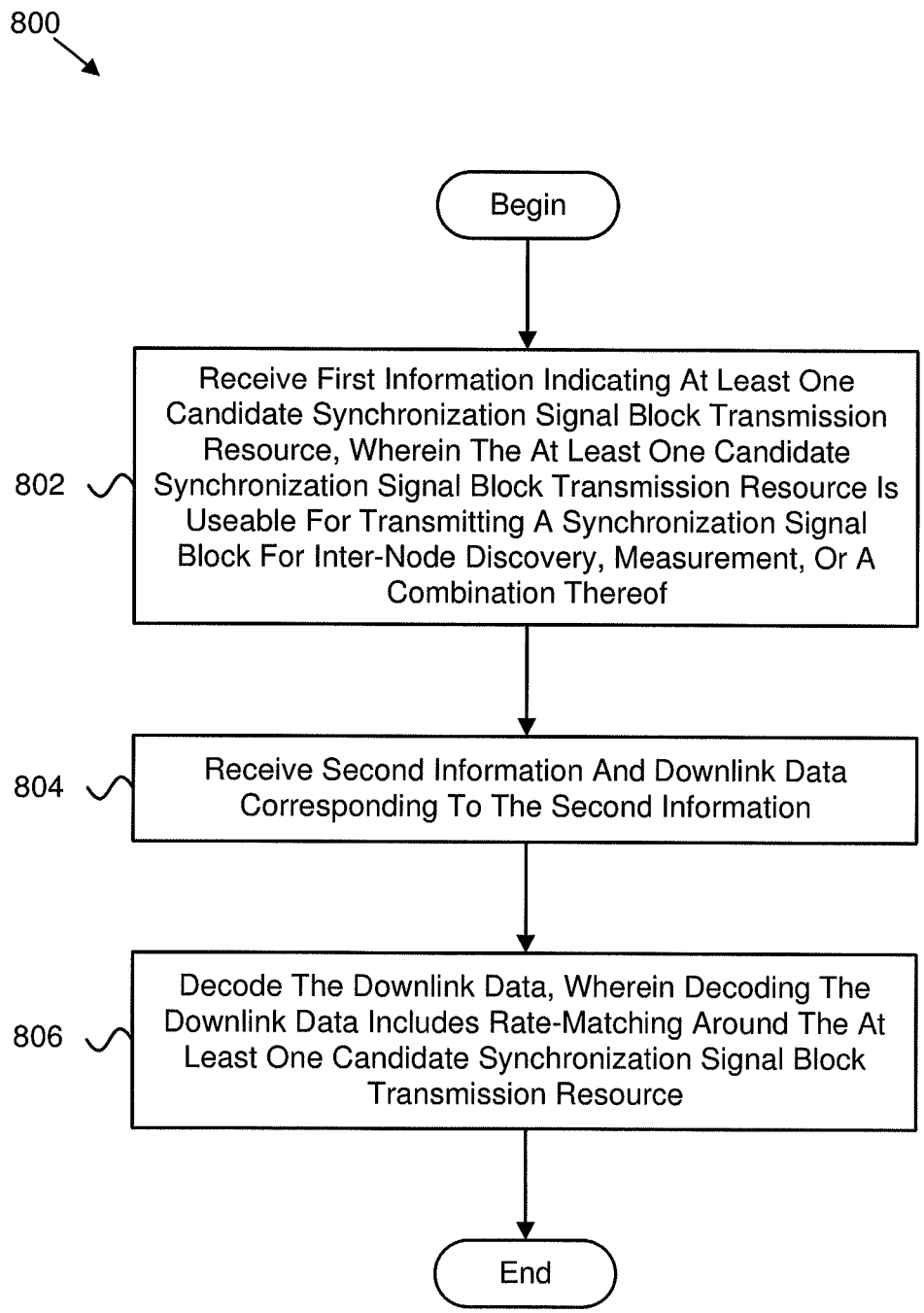
FIG. 8 is a schematic flow chart diagram illustrating one embodiment of a method for determining candidate synchronization signal block transmission resources.

FIG. 8 is a schematic flow chart diagram illustrating one embodiment of a method 800 for determining candidate synchronization signal block transmission resources. In some embodiments, the method 800 is performed by an apparatus, such as the remote unit 102 or the network unit 104 (e.g., IAB node). In certain embodiments, the method 800 may be performed by a processor executing program code, for example, a microcontroller, a microprocessor, a CPU, a GPU, an auxiliary processing unit, a FPGA, or the like.

The method 800 may include receiving 802 first information indicating at least one candidate synchronization signal block transmission resource. In such an embodiment, the at least one candidate synchronization signal block transmission resource is useable for transmitting a synchronization signal block for inter-node discovery, measurement, or a combination thereof. In certain embodiments, the method 800 includes receiving 804 second information and downlink data corresponding to the second information. In various embodiments, the method 800 includes decoding 806 the downlink data. In such embodiments, decoding the downlink data includes rate-matching around the at least one candidate synchronization signal block transmission resource.

In various embodiments, the second information comprises scheduling information for scheduling the downlink data. In some embodiments, the method comprises receiving at least one synchronization signal block corresponding to each candidate synchronization signal block transmission resource of the at least one candidate synchronization signal block transmission resource. In certain embodiments, an offset corresponding to the at least one candidate synchronization signal block transmission resource is configured to change at different time instances with respect to a starting position.

In one embodiment, the time instances occur periodically, and a time difference between two adjacent time instances is configured by radio resource signaling. In various embodiments, the starting position is determined by setting the offset equal to zero with respect to a time instance. In some embodiments, a number of candidate synchronization signal block transmission resources of the at least one candidate synchronization signal block transmission resource is configured by radio resource control signaling.

In certain embodiments, an index of a node is configured by radio resource control signaling. In one embodiment, rate-matching around the at least one candidate synchronization signal block transmission resource comprises decoding the downlink data while precluding resource elements used for the at least one candidate synchronization signal block transmission resource. In various embodiments, the first information that indicates the at least one candidate synchronization signal block transmission resource comprises a set index that indicates the at least one candidate synchronization signal block transmission resource.

In some embodiments, the at least one candidate synchronization signal block transmission resource is transmitted periodically based on a periodicity, and the periodicity is configured by radio resource control signaling. In certain embodiments, the set index is indicated by radio resource control signaling. In one embodiment, a relationship between the set index and the at least one candidate synchronization signal block transmission resource is configured by radio resource control signaling.

In various embodiments, a maximum number of sets is configured by radio resource control signaling. In some embodiments, the set index is updatable at each time instance, wherein time instances occur periodically, and a time difference between two adjacent time instances is configurable by radio resource control signaling. In certain embodiments, some synchronization signal blocks corresponding to the at least one candidate synchronization signal block transmission resource are not transmitted.

In one embodiment, rate-matching around the at least one candidate synchronization signal block transmission resource comprises decoding the downlink data while precluding resource elements used for actual synchronization signal block transmission corresponding to the at least one candidate synchronization signal block transmission resource. In various embodiments, the at least one candidate synchronization signal block transmission resource is configured by radio resource control signaling. In some embodiments, actual synchronization signal block transmissions corresponding to the at least one candidate synchronization signal block transmission resource are indicated by downlink control information signaling.

In certain embodiments, downlink control information is used to indicate the actual synchronization signal block transmissions that occur in the same time domain resource of a scheduled physical downlink shared channel. In one embodiment, multiple actually transmitted synchronization signal block sets are configured by radio resource control signaling. In various embodiments, downlink control information is used to select one of the actually transmitted synchronization signal block sets configured by radio resource control signaling.

In one embodiment, a method comprises: receiving first information indicating at least one candidate synchronization signal block transmission resource, wherein the at least one candidate synchronization signal block transmission resource is useable for transmitting a synchronization signal block for inter-node discovery, measurement, or a combination thereof; receiving second information and downlink data corresponding to the second information; and decoding the downlink data, wherein decoding the downlink data comprises rate-matching around the at least one candidate synchronization signal block transmission resource.

In various embodiments, the second information comprises scheduling information for scheduling the downlink data.

In some embodiments, the method comprises receiving at least one synchronization signal block corresponding to each candidate synchronization signal block transmission resource of the at least one candidate synchronization signal block transmission resource.

In certain embodiments, an offset corresponding to the at least one candidate synchronization signal block transmission resource is configured to change at different time instances with respect to a starting position.

In one embodiment, the time instances occur periodically, and a time difference between two adjacent time instances is configured by radio resource signaling.

In various embodiments, the starting position is determined by setting the offset equal to zero with respect to a time instance.

In some embodiments, a number of candidate synchronization signal block transmission resources of the at least one candidate synchronization signal block transmission resource is configured by radio resource control signaling.

In certain embodiments, an index of a node is configured by radio resource control signaling.

In one embodiment, rate-matching around the at least one candidate synchronization signal block transmission resource comprises decoding the downlink data while precluding resource elements used for the at least one candidate synchronization signal block transmission resource.

In various embodiments, the first information that indicates the at least one candidate synchronization signal block transmission resource comprises a set index that indicates the at least one candidate synchronization signal block transmission resource.

In some embodiments, the at least one candidate synchronization signal block transmission resource is transmitted periodically based on a periodicity, and the periodicity is configured by radio resource control signaling.

In certain embodiments, the set index is indicated by radio resource control signaling.

In one embodiment, a relationship between the set index and the at least one candidate synchronization signal block transmission resource is configured by radio resource control signaling.

In various embodiments, a maximum number of sets is configured by radio resource control signaling.

In some embodiments, the set index is updatable at each time instance, wherein time instances occur periodically, and a time difference between two adjacent time instances is configurable by radio resource control signaling.

In certain embodiments, some synchronization signal blocks corresponding to the at least one candidate synchronization signal block transmission resource are not transmitted.

In one embodiment, rate-matching around the at least one candidate synchronization signal block transmission resource comprises decoding the downlink data while precluding resource elements used for actual synchronization signal block transmission corresponding to the at least one candidate synchronization signal block transmission resource.

In various embodiments, the at least one candidate synchronization signal block transmission resource is configured by radio resource control signaling.

In some embodiments, actual synchronization signal block transmissions corresponding to the at least one candidate synchronization signal block transmission resource are indicated by downlink control information signaling.

In certain embodiments, downlink control information is used to indicate the actual synchronization signal block transmissions that occur in the same time domain resource of a scheduled physical downlink shared channel.

In one embodiment, multiple actually transmitted synchronization signal block sets are configured by radio resource control signaling.

In various embodiments, downlink control information is used to select one of the actually transmitted synchronization signal block sets configured by radio resource control signaling.

In one embodiment, an apparatus comprises: a receiver that: receives first information indicating at least one candidate synchronization signal block transmission resource, wherein the at least one candidate synchronization signal block transmission resource is useable for transmitting a synchronization signal block for inter-node discovery, measurement, or a combination thereof; and receives second information and downlink data corresponding to the second information; and a processor that decodes the downlink data, wherein decoding the downlink data comprises rate-matching around the at least one candidate synchronization signal block transmission resource.

In various embodiments, the second information comprises scheduling information for scheduling the downlink data.

In some embodiments, the receiver receives at least one synchronization signal block corresponding to each candidate synchronization signal block transmission resource of the at least one candidate synchronization signal block transmission resource.

In certain embodiments, an offset corresponding to the at least one candidate synchronization signal block transmission resource is configured to change at different time instances with respect to a starting position.

In one embodiment, the time instances occur periodically, and a time difference between two adjacent time instances is configured by radio resource signaling.

In various embodiments, the starting position is determined by setting the offset equal to zero with respect to a time instance.

In some embodiments, a number of candidate synchronization signal block transmission resources of the at least one candidate synchronization signal block transmission resource is configured by radio resource control signaling.

In certain embodiments, an index of a node is configured by radio resource control signaling.

In one embodiment, rate-matching around the at least one candidate synchronization signal block transmission resource comprises decoding the downlink data while precluding resource elements used for the at least one candidate synchronization signal block transmission resource.

In various embodiments, the first information that indicates the at least one candidate synchronization signal block transmission resource comprises a set index that indicates the at least one candidate synchronization signal block transmission resource.

In some embodiments, the at least one candidate synchronization signal block transmission resource is transmitted periodically based on a periodicity, and the periodicity is configured by radio resource control signaling.

In certain embodiments, the set index is indicated by radio resource control signaling.

In one embodiment, a relationship between the set index and the at least one candidate synchronization signal block transmission resource is configured by radio resource control signaling.

In various embodiments, a maximum number of sets is configured by radio resource control signaling.

In some embodiments, the set index is updatable at each time instance, wherein time instances occur periodically, and a time difference between two adjacent time instances is configurable by radio resource control signaling.

In certain embodiments, some synchronization signal blocks corresponding to the at least one candidate synchronization signal block transmission resource are not transmitted.

In one embodiment, rate-matching around the at least one candidate synchronization signal block transmission resource comprises decoding the downlink data while precluding resource elements used for actual synchronization signal block transmission corresponding to the at least one candidate synchronization signal block transmission resource.

In various embodiments, the at least one candidate synchronization signal block transmission resource is configured by radio resource control signaling.

In some embodiments, actual synchronization signal block transmissions corresponding to the at least one candidate synchronization signal block transmission resource are indicated by downlink control information signaling.

In certain embodiments, downlink control information is used to indicate the actual synchronization signal block transmissions that occur in the same time domain resource of a scheduled physical downlink shared channel.

In one embodiment, multiple actually transmitted synchronization signal block sets are configured by radio resource control signaling.

In various embodiments, downlink control information is used to select one of the actually transmitted synchronization signal block sets configured by radio resource control signaling.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
   receiving first information via radio resource control (RRC) signaling indicating resource locations of a plurality of candidate synchronization signal block (SSB) transmission resources, wherein the plurality of candidate SSB transmission resources is useable for transmitting an SSB for inter-node discovery, measurement, or a combination thereof;
   receiving second information and downlink data corresponding to the second information; and
   decoding the downlink data, wherein decoding the downlink data comprises rate-matching around the plurality of candidate SSB transmission resources.

2. The method of claim 1, wherein the second information comprises scheduling information for scheduling the downlink data.

3. The method of claim 1, further comprising receiving at least one SSB corresponding to each candidate SSB transmission resource of the plurality of candidate SSB transmission resources.

4. The method of claim 1, wherein an offset corresponding to the plurality of candidate SSB transmission resources is configured to change at different time instances with respect to a starting position.

5. The method of claim 4, wherein the time instances occur periodically, and a time difference between two adjacent time instances is configured by RRC signaling.

6. The method of claim 4, wherein the starting position is determined by setting the offset equal to zero with respect to a time instance.

7. The method of claim 4, wherein a number of candidate SSB transmission resources of the plurality of candidate SSB transmission resources is configured by RRC signaling.

8. The method of claim 4, wherein an index of a node is configured by RRC signaling.

9. The method of claim 1, wherein rate-matching around the plurality of candidate SSB transmission resources comprises decoding the downlink data while precluding resource elements used for the plurality of candidate SSB transmission resources.

10. The method of claim 1, wherein the first information that indicates the plurality of candidate SSB transmission resources comprises a set index that indicates the plurality of candidate SSB transmission resources.

11. The method of claim 10, wherein the plurality of candidate SSB transmission resources is transmitted periodically based on a periodicity, and the periodicity is configured by RRC signaling.

12. The method of claim 10, wherein the set index is indicated by RRC signaling.

13. The method of claim 10, wherein a relationship between the set index and the plurality of candidate SSB transmission resources is configured by RRC signaling.

14. The method of claim 10, wherein a maximum number of sets is configured by RRC signaling.

15. The method of claim 10, wherein the set index is updatable at each time instance, wherein time instances occur periodically, and a time difference between two adjacent time instances is configurable by RRC signaling.

16. The method of claim 1, wherein some SSBs corresponding to the plurality of candidate SSB transmission resources are not transmitted.

17. The method of claim 16, wherein rate-matching around the plurality of candidate SSB transmission resources comprises decoding the downlink data while precluding resource elements used for actual SSB transmission corresponding to the plurality of candidate SSB transmission resources.

18. The method of claim 16, wherein the plurality of candidate SSB transmission resources is configured by RRC signaling.

19. The method of claim 16, wherein actual SSB transmissions corresponding to the plurality of candidate SSB transmission resources are indicated by downlink control information signaling.

20. The method of claim 19, wherein downlink control information is used to indicate the actual SSB transmissions that occur in the same time domain resource of a scheduled physical downlink shared channel.

21. The method of claim 16, wherein multiple actually transmitted SSB sets are configured by RRC signaling.

22. A user equipment (UE), comprising:
   at least one memory; and
   at least one processor coupled with the at least one memory and configured to cause the UE to:
      receive first information via radio resource control (RRC) signaling indicating resource locations of a plurality of candidate synchronization signal block (SSB) transmission resources, wherein the plurality of candidate SSB transmission resources is useable for transmitting an SSB for inter-node discovery, measurement, or a combination thereof;
      receive second information and downlink data corresponding to the second information; and
      decode the downlink data, wherein decoding the downlink data comprises rate-matching around the plurality of candidate SSB transmission resources.

23. A processor for wireless communication, comprising:
   at least one controller coupled with at least one memory and configured to cause the processor to:
      receive first information via radio resource control (RRC) signaling indicating resource locations of a plurality of candidate synchronization signal block (SSB) transmission resources, wherein the plurality of candidate SSB transmission resources is useable for transmitting an SSB for inter-node discovery, measurement, or a combination thereof;
      receive second information and downlink data corresponding to the second information; and
      decode the downlink data, wherein decoding the downlink data comprises rate-matching around the plurality of candidate SSB transmission resources.

* * * * *